United States Patent [19]

Cross

[11] Patent Number: 5,006,688
[45] Date of Patent: Apr. 9, 1991

[54] LASER-ARC APPARATUS AND METHOD FOR CONTROLLING PLASMA CLOUD

[75] Inventor: Michael A. Cross, Severna Park, Md.

[73] Assignee: Westinghouse Electric Corp., Pittsburgh, Pa.

[21] Appl. No.: 261,545

[22] Filed: Oct. 24, 1988

[51] Int. Cl.$^5$ .............................................. B23K 9/067
[52] U.S. Cl. .............................. 219/130.4; 219/121.64; 219/130.51
[58] Field of Search ................ 219/130.4, 127, 130.51, 219/121.64

[56] References Cited

U.S. PATENT DOCUMENTS

| | | | |
|---|---|---|---|
| 3,301,996 | 1/1967 | Bidwell | 219/127 |
| 3,872,279 | 3/1975 | Fairbairn | 219/121.64 |
| 4,167,662 | 9/1979 | Steen | 219/121.64 |
| 4,507,540 | 3/1985 | Hamasaki | 219/121.64 |
| 4,829,153 | 5/1989 | Correy | 219/130.4 |

FOREIGN PATENT DOCUMENTS

| | | | |
|---|---|---|---|
| 62-263869 | 5/1986 | Japan | 219/121.64 |
| 187894 | 10/1966 | U.S.S.R. | 219/121.64 |

OTHER PUBLICATIONS

Steen, "Arc Augmented Laser Processing of Materials", J. Appl. Phys., Nov. 1980, pp. 5636-5641.

Primary Examiner—Clifford C. Shaw
Attorney, Agent, or Firm—W. G. Sutcliff

[57] ABSTRACT

A pulsed laser arc welding method and apparatus whereby a pulsed input laser beam is generated by a laser pulse generator to cause an ionized plasma cloud to be generated at a worksite. A power supply supplies energy to an arc welding device, which is stored in a capacitor therein. This energy is drawn out of the storage capacitor once the ionized plasma cloud is sufficiently conductive. Control circuitry is provided to control the pulse repetition frequency of the laser pulse generator and to control the energy dissipation from the storage capacitor in the arc welding device.

20 Claims, 7 Drawing Sheets

LASER-ARC APPARATUS AND METHOD FOR CONTROLLING PLASMA CLOUD

FIELD OF THE PRESENT INVENTION

The present invention relates to a method and apparatus for arc welding and cutting, and more particularly to a laser triggered pulsed arc welding device for welding and cutting.

BACKGROUND OF THE PRESENT INVENTION

Conventional laser-arc welding devices operate by projecting a laser beam from a laser source onto a worksite of a workpiece and striking an arc between an electrode of the arc welder and the worksite.

This is shown for example in FIG. 1A, wherein reference numeral 1 refers to a laser head including a support structure 2 and a focusing lens 3 for focusing a laser beam 4 onto a worksite 5 of a workpiece 6. The incident laser beam 4 heats the worksite 5 and an arc welding torch 7 arcs current from an electrode 8 to the worksite 5 to provide the welding or cutting operation.

As shown in FIG. 1A, the arc welding torch 7 can be provided on the same side of the workpiece 6 as is the laser head 1. However, as shown in FIG. 1B, if the workpiece 6 is sufficiently thin to allow proper heating of the worksite 5 the arc welding torch 7 may be provided on the opposite side of the workpiece 6 from the laser head 1 so as to make the system more flexible. Further, in these conventional devices some type of electro-mechanical control (not shown) is provided in order to move the workpiece 6 with respect to the stationary laser head 1 and arc welding torch 7 or to move the laser head 1 and arc welding torch 7 with respect to the stationary workpiece 6.

In operation, the incident laser beam 4 of a conventional laser-arc welding device causes the worksite 5 to melt and vaporize which in turn causes a molten material and a plasma cloud to exist at the worksite 5. Additional energy is provided to the worksite 5 by the arc current from the electrode 8 which tends to root along the plasma cloud to the worksite 5. In other words, the plasma cloud caused by the heated worksite 5 provides a low resistance, conductive path for the arc current from the electrode 8 of the arc welding torch 7 to the worksite 5.

In these conventional devices, the laser beam and the arc current from the arc welder are operated continuously to allow both sources of energy to perform the welding or cutting operation at the same time. However, this continuous operation creates a significant problem in that while the plasma cloud initially provides a low resistance, conductive path to couple the arc energy to the worksite, it has been found that this initial efficient coupling is quickly dissipated as the welding operation continues. In particular, as the laser beam or arc remains on, the plasma cloud becomes more highly ionized and introduces a great deal of attenuation into the incident laser beam path. This in turn prevents the laser beam from efficiently heating the worksite 5 by reducing the strength of the laser beam.

This problem is significantly magnified when using highly reflective metals such as aluminum and copper which are most commonly used today as workpiece metals. These highly reflective metals produce a near 180° phase shift in the incident wave, significantly reducing the field strength of the light beam at the work surface. An example of this application might be the welding of a flexible printed circuit-ribbon conductor to a linear multi-pin connector. If copper or aluminum are used as the conductors, it becomes very difficult to couple the optical energy from the laser beam to the weldsite between the conductors and connectors. Further, in welding these very small weldsites, it is important to control both the timing and location in applying the optical and electrical energy because these small weldsites can be completely melted if excessive energy is applied.

Thus, conventional laser-arc welding devices suffer from the disadvantage of being extremely costly because the continuous laser energy applied to the worksite is very expensive. Further, due to the reflectivity of the workpiece, it may be necessary for the laser beam to be operated at close to maximum output in order to couple enough energy into the workpiece. This, of course, reduces the life expectancy of the laser source.

Some conventional laser-arc welding devices attempt to overcome the foregoing plasma interference problems by utilizing an inert gas directed at the worksite to blow away the plasma cloud so as to limit the interference with the incident laser beam. However, as indicated above, this plasma cloud has significant advantages in conducting and rooting the arc current from the arc welding torch to the worksite. Therefore, dissipating the plasma cloud also eliminates the advantages that accompany it.

SUMMARY OF THE INVENTION

Therefore, it is an object of the present invention to provide a laser-arc welding method and apparatus to overcome the foregoing problems and disadvantages of conventional devices by providing a laser-arc welding device which utilizes the advantages of a plasma cloud generated by a laser beam in an efficient and economical manner.

To achieve this and other objects, and in accordance with the purpose of the invention, as embodied and broadly described herein, the present invention provides control circuitry to pulse the laser beam on and off at a predetermined time interval so that the plasma cloud is generated long enough to conduct stored energy from the arc welding torch to the worksite, but not long enough to allow the plasma cloud to develop into a laser beam energy-attenuating interference cloud.

According to the present invention, the laser-arc welding apparatus comprises: a laser-pulse generator for generating a laser pulse and directing the laser pulse toward a worksite on a workpiece, the laser pulse creating a plasma cloud at the worksite by heating the worksite; an arc welding device for arcing energy from an electrode thereof to the worksite; a power supply for supplying the energy to said arc welding device; a storage device for storing the energy supplied to the arc welding device; and a control device means for controlling the laser pulse generator to generate a laser pulse of sufficient duration to cause the plasma cloud to be sufficiently conductive to draw the stored energy from the storage device in the arc welding device to the worksite.

The foregoing features of the present invention significantly reduce the required laser energy because the laser beam is not continuous and is therefore not as significantly attenuated by the interfering plasma cloud. This also reduces the cost of the welding or cutting operation significantly. Additionally, the benefits from utilizing the initial plasma cloud, i.e., the low resistance conductive path for striking, conducting and rooting the arc current, are maintained.

BRIEF DESCRIPTION OF THE DRAWINGS

The accompanying drawings which are incorporated in and constitute a part of the specification, illustrate different embodiments of the invention and, together with the description, serve to explain the principles of the invention. The objects and features of the present invention will become apparent from the description of the preferred embodiments of the present invention taken in conjunction with the accompanying drawings, wherein.

DETAILED DESCRIPTION OF THE INVENTION

Figure 1A:
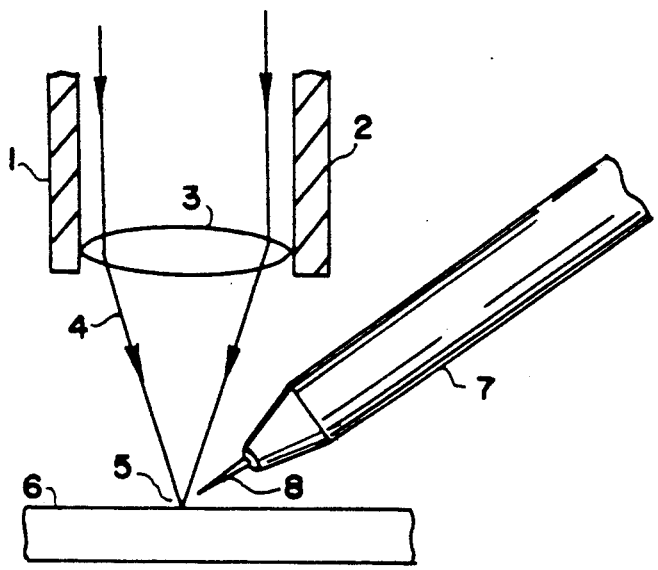
FIGS. 1A and 1B show conventional laser-arc welding devices.
Figure 1B:
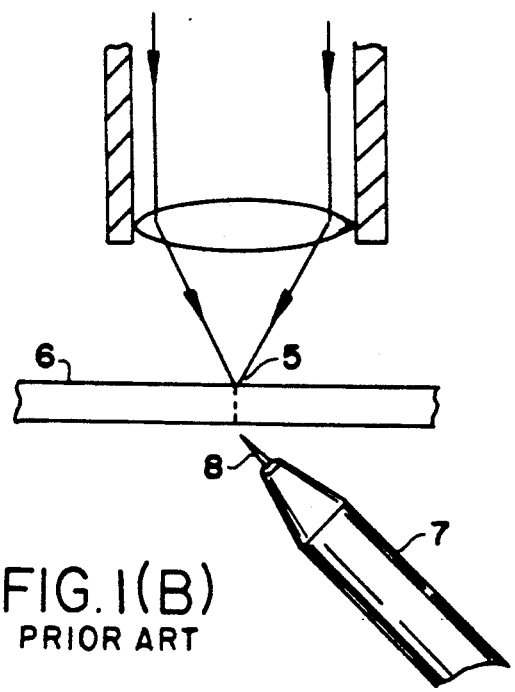
Figure 2:
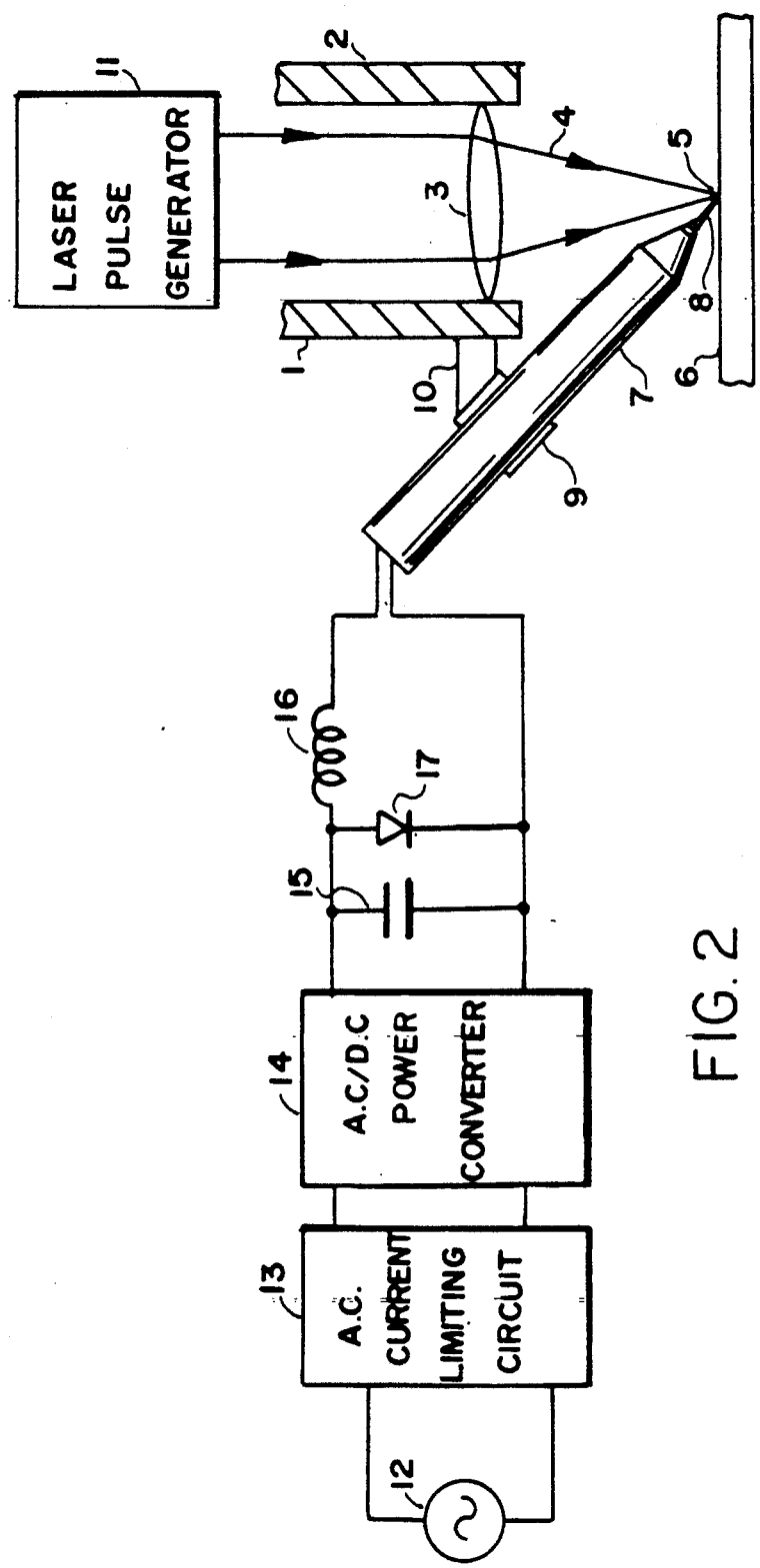
FIG. 2 shows a laser-arc welding device, including control circuitry for controlling the laser beam and the arc welding device, in accordance with the present invention.

As shown in FIG. 2, the actual structure of the laser head 1 and the arc welding torch 7 may be similar to that of conventional laser-arc welding devices shown in FIGS. 1A and 1B and therefore like components in FIG. 2 have been labeled with like reference numerals. In addition, the arc welding torch 7 may be tiltably mounted to the support structure 2 of the laser head 1 by means of the bracket 9 and support extension 10 as shown in FIG. 2.

In FIG. 2, reference numeral 11 designates a laser pulse generator for generating laser pulses incident to the worksite 5. It is the timing of these laser pulses which establishes the arcing of current pulses from the electrode tip 8 of the arc welding torch 7 to the worksite 5 because energy stored in the arc welding torch 7 only discharges once the conductive plasma cloud created by the heating of the laser pulse is sufficiently ionized to draw this stored energy from the arc welding torch 7. Thus, the arcing of the arc welding torch is directly dependent on the generation of the laser pulses.

FIG. 2 also shows the energy control circuitry for the arc welding device of the present invention. The arc welding torch 7 is supplied with power from an AC power source 12, which is limited by A.C. current limiting circuit 13 and converted into DC power by an AC to DC power converter 14. This energy which is to be arced from the electrode 8 to the worksite 5 is stored in a storage capacitor 15. The storage capacitor 15 is part of a critically damped discharge network which also includes inductor 16 and a resistance corresponding to the arc load. This critically damped discharge network determines the current pulse waveshape in the arc.

Additionally, a free-wheeling diode 17 is provided to deliver the energy stored in the collapsing magnetic field of the inductor 16 to the arc load as the current pulse falls toward zero. Without the free-wheeling diode 17, energy delivery to the arc load is less efficient because the energy stored in the inductor 16 tends to charge the storage capacitor 15 with reverse polarity. The AC current limiting circuit 13 is provided to control the rate at which the storage capacitor 15 is charged between laser pulses. If the storage capacitor 15 is charged too rapidly, uncontrolled continuous arcing may result.

Because of the dependency between the conductivity of the plasma clouds generated by the laser pulses, and the discharging of the storage capacitor 15, the period between laser pulses must be selected to permit complete recharge of the storage capacitor 15 to enable sufficient energy to be stored to provide the necessary arc current. The laser pulse generator 11 may therefore include any known form of pulse controller for controlling the pulse period of the laser pulses, the interval between pulses or both. For example, any type of programmed or programmable processor may be included to control the pulse generation and may have application in performing a robotic welding operation which requires different welds at different worksites or different between pulse intervals for allowing movement and set up of the workpiece at the correct weldsite.

Figure 3:
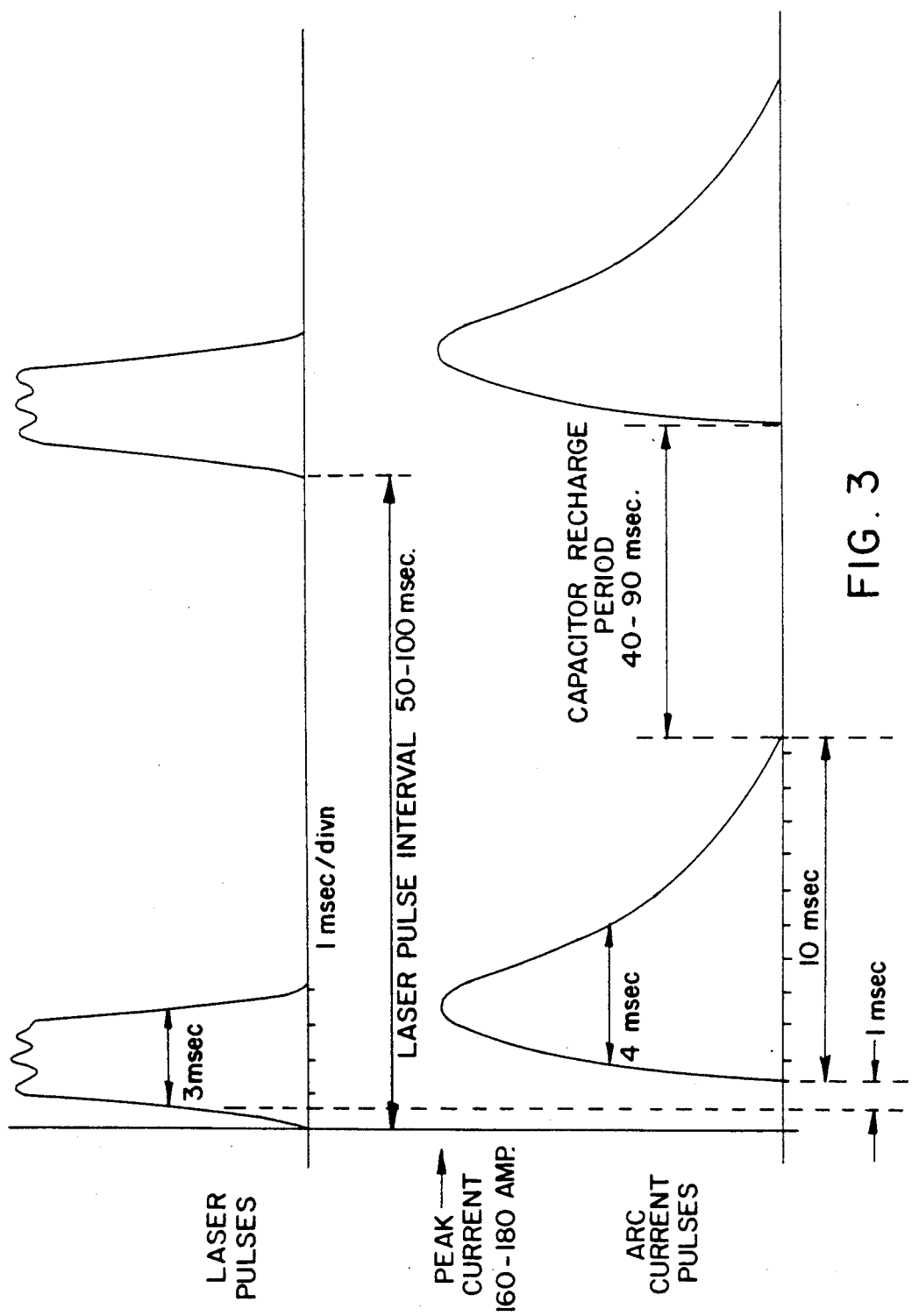

FIG. 3 shows a timing diagram of exemplary laser pulses and arc current pulses for enabling proper arcing of the storage capacitor is as follows. To provide proper interaction between the laser pulses and arc current pulses, a laser/arc pulse overlap condition may be necessary. For example, a 3 msec full-width half maximum laser pulse may be used to discharge the stored energy which fires approximately 1 msec into the laser pulse. The stored energy may discharge as an arc current pulse having a 10 msec baseline width and 4 msec full width half maximum. Typically, the laser pulse interval is selected to be from 50-100 msec which allows sufficient time for the storage capacitor 15 to completely recharge. This recharge period may range from 40-90 msec, depending on the selected laser pulse interval.

Figure 4:
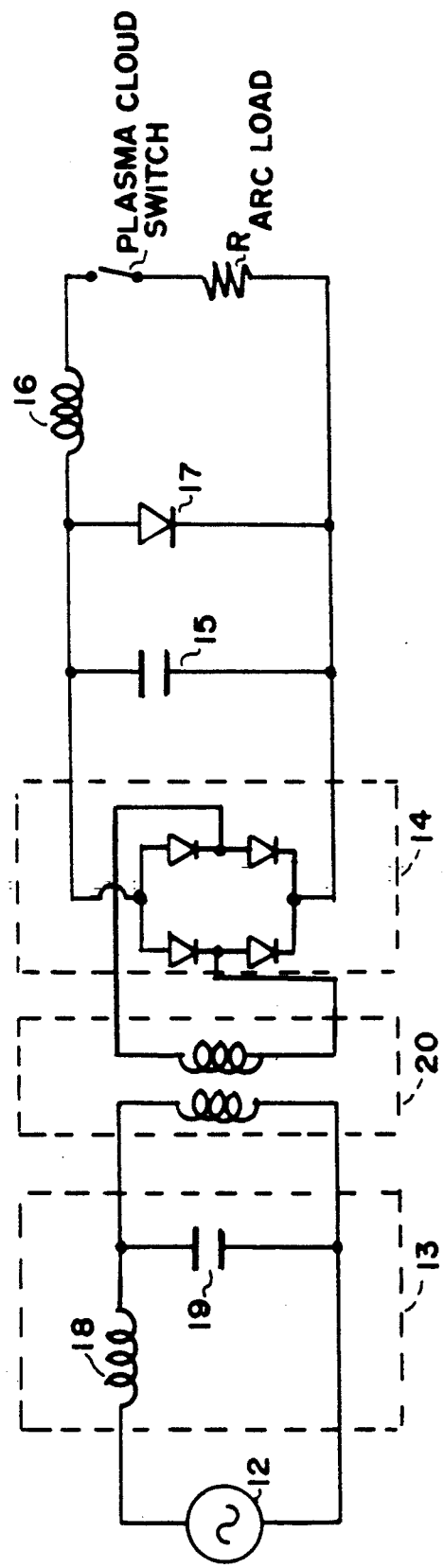
FIG. 4 is a schematic drawing of the control circuitry for the arc welding device in accordance with one embodiment of the present invention.

FIG. 4 is a schematic diagram of the energy control circuitry for the arc welding device according to the present invention. As shown, the AC current limiting circuit 13 may comprise an inductor 18 and a capacitor 19. The output side of the inductor 18 is connected to the primary winding of a high voltage power transformer 20 which steps up the voltage from the AC power input 12. This high voltage AC power is then converted to DC power in the AC/DC power converter 14, which may comprise a bridge-rectifier circuit. While this embodiment of the present invention shows a diode-bridge configuration, it will be recognized by those of ordinary skill that any form of rectification suitable for providing an AC to DC power conversion can be utilized. The DC energy is then stored in the storage capacitor 15 which may comprise, for example, a bank of storage capacitors. The energy is stored in the capacitor 15 until the plasma cloud (which acts as a switch) is conductive enough to draw this energy from the storage capacitor 15 and arc the energy from the arc welding torch 7 ($R_{arc}$ load shown in FIG. 4) to the worksite 5.

Figure 5:
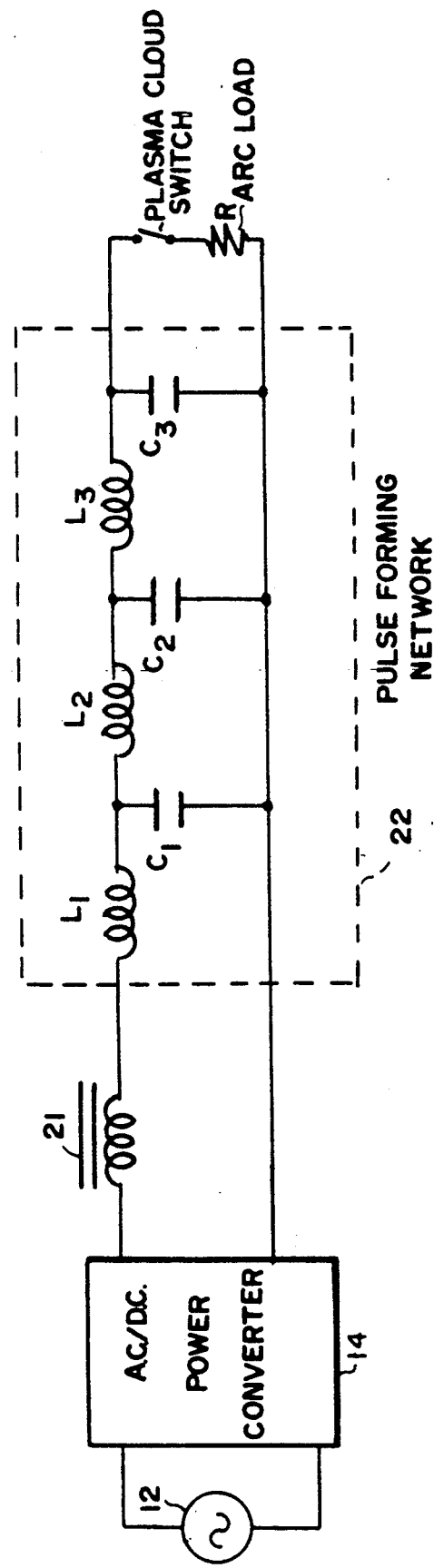
FIG. 5 is a schematic drawing of the control circuitry for the arc welding device in accordance with another embodiment of the present invention.

FIG. 5 shows a second embodiment of the energy control circuitry of the arc welding device of the present invention. As shown, the critically damped discharge network shown in FIG. 2 has been replaced with a pulse forming network 22.

The pulse-forming network 22 comprises a three-mesh discharge circuit which includes a first mesh comprising inductor $L_1$ and capacitor $C_1$, a second mesh comprising inductor $L_2$ and capacitor $C_2$ and a third mesh comprising inductor $L_3$ and capacitor $C_3$. The capacitors $C_1$, $C_2$ and $C_3$ provide the energy storage capacitance for storing the current to be arced to the worksite. It will be recognized by those skilled in the art that any number of mesh units may be provided for the pulse forming network 22.

In addition to the foregoing pulse-forming network 22, the second embodiment does not require the AC current limiting circuit 13, but instead provides a hold-off inductor 21 after the AC/DC power converter 14 for improving the power delivery to the arc welding torch 7. The hold-off inductor 21 is selected so that its time constant, in conjunction with the characteristic impedance of the pulse-forming network 22, approximates the inter-pulse period of the laser pulse generator 11. In particular, the hold-off inductor 21 ensures that the arc is completely turned off in between laser pulses. This is necessary because if the pulse forming network 22 is recharged from a low impedance power supply, there is a high probability of continuous arcing, which prevents proper pulse characteristics. The hold-off inductor 21 is therefore provided to limit the initial current rush to the pulse-forming network 22 during a recharge cycle.

Figure 6:
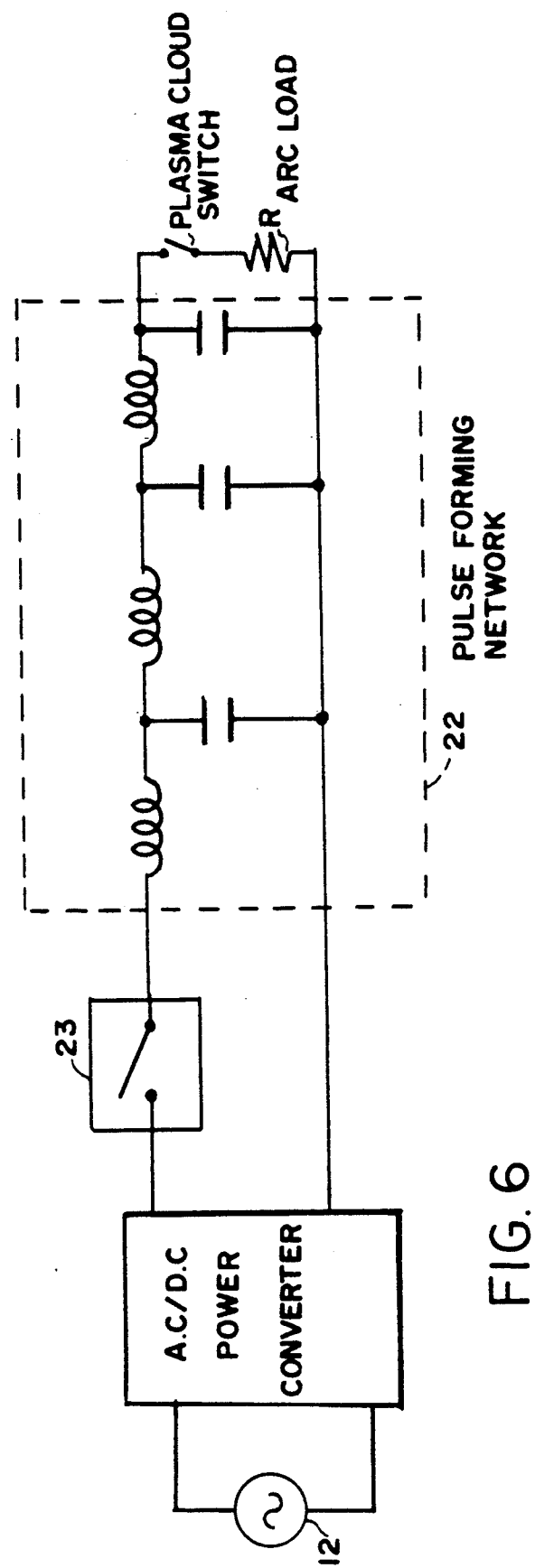
FIG. 6 is a schematic drawing of the control circuitry for the arc welding device in accordance with another embodiment of the present invention.

While FIG. 5 shows an inductor 21 to be used for holding off the recharge current from the pulse-forming network 22, as shown in FIG. 6, this hold-off inductor 21 may be replaced by any type of electronic switching network 23 for providing the same function. The switching operation of the switching network 23 may be synchronized with the pulse-generating frequency of the laser pulse generator 11 to ensure proper pulse formation by the pulse forming network 22 in conjunction with the generated pulse laser beam.

Figure 7:
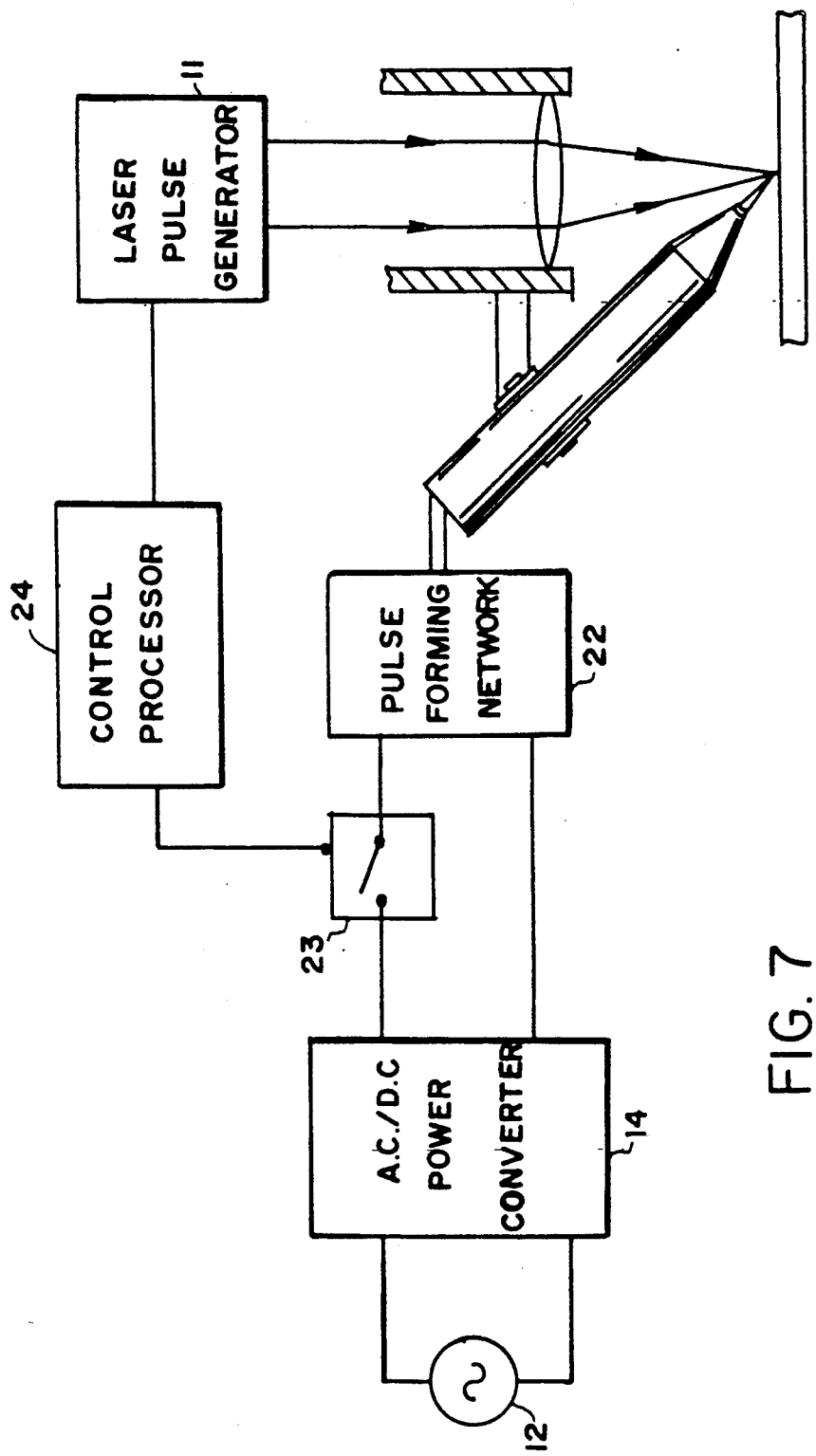
FIG. 7 is a schematic drawing of the control circuitry for both the arc welding device and the laser pulse generator in accordance with another embodiment of the present invention.

Further, in an other embodiment shown in FIG. 7, control of the switching network 23 and the laser pulse generator 11 may be provided by a common control processing unit 24. The processor may be programmable or pre-programmed for manufacturing operations, in particular, for robotic welding applications.

In addition to the foregoing features, the present invention may include any conventional shield gas arrangements desired. Conventional arc welders frequently employ shield gases such as argon or helium for shielding the laser pulse, the welding arc or both. Although not shown specifically in the drawings, the methods and apparatus for providing these shield gases are conventional in the art and may be included in the present invention in any of the conventional manners.

The features of the present invention described above enable the present invention to provide highly accurate welds at a significantly reduced cost. This is because the present invention takes advantage of the phenomenon caused by the creation of the plasma cloud at the worksite which causes energy stored in the arc welding device to conduct along the plasma to be precisely rooted to the worksite. This allows very efficient coupling between both the energy supplied from the laser pulse and the arcing energy and promotes a steering effect of the captured arc to the worksite. Such features are most important in robotic manufacturing scenarios.

Further, the present invention overcomes the disadvantages of conventional devices, which are subjected to significant attenuation of the incident laser beam energy due to the reflectivity of the work surface. Highly reflective metal surfaces (e.g. copper) may be welded or cut because the laser energy need only be sufficient to trigger the arc pulse which provides most of the welding energy, and is unaffected by reflectivity. Further, a weak laser plasma, typical of reflective metals such as copper, can reliably trigger the arc due to the high striking potential on the torch electrode which is an order of magnitude greater than that used in a conventional arc welding device.

The pulsed laser-arc welding device according to the present invention retains a major advantage of conventional laser arc welding devices in that thermal input to the workpiece itself is reduced because maximum energy density is achieved at the worksite as a result of the accurately directed arc energy and pulsed high-current energy delivery.

While the above description of the present invention is directed to use of a laser-arc welding device as a welding device, it will be recognized by those of ordinary skill in the art that this device can be used as a cutting device or any other type of surface preparation device using a laser energy source and a supplemental energy supply.

Further, while the present invention has been described in terms of the foregoing embodiments, it should be understood that numerous modifications may be made thereto without departing from the spirit and scope of the invention as defined in the appended claims.

What is claimed is:

1. A laser-arc apparatus comprising:
   a laser pulse generator for generating a laser pulse and directing said laser pulse toward a worksite on a workpiece, said laser pulse creating a plasma cloud at said worksite by heating said worksite;
   an arcing means for arcing energy from an electrode thereof to said worksite;
   a power supply for supplying said energy to said arcing means;
   storage means for storing said energy supplied to said arcing means;
   control means, including circuit means for controlling said laser pulse generator to generate a train of laser pulses, each pulse of the train having a predetermined duration and pulse interval, each pulse duration being sufficient to cause said plasma cloud to be sufficiently conductive to draw said stored energy from said storage means in said arcing means to said worksite for initiating an arc and each pulse interval being of sufficient duration for dissipating each created plasma cloud.

2. A laser-arc apparatus according to claim 1, wherein said predetermined laser pulse interval is in the range of 50-100 msec.

3. A welding or cutting method comprising the steps of:
   (a) heating a worksite using repetitive laser pulses to generate a plasma cloud at said worksite;
   (b) storing energy repetitively to be used in welding or cutting said worksite;
   (c) conducting repetitively said energy to said worksite along said plasma cloud; and (d) synchronizing repetitively said heating, storing and conducting step for dissipating said plasma cloud.

4. A method of controlling a laser-arc device including a laser generator for directing a laser toward a worksite and an arcing device for arcing energy to said worksite, comprising the steps of:
   (a) storing said energy to be arced to said worksite in said arcing device;
   (b) generating laser pulses repetitively, each having sufficient duration to generate a plasma cloud sufficiently conductive to arc said stored energy to said worksite;
   (c) extinguishing each laser pulse for an interval of approximately 50 to 100 m seconds prior to the next generated laser pulse for dissipating the plasma cloud.

5. A method of controlling a laser-arc device according to claim 4, further comprising the step of controlling the storing of said energy such that said energy is held in said arc welding device between said laser pulses.

6. A laser-arc apparatus comprising:
   a laser pulse generator for generating a laser pulse and directing said laser pulse toward a worksite on a workpiece, said laser pulse creating a plasma cloud at said worksite by heating said worksite;
   an arcing means for arcing energy from an electrode thereof to said worksite;
   a power supply for supplying said energy to said arcing means;
   storage means having a pulse forming network including an inductor-capacitor discharge circuit for receiving and storing the energy and forming an energy pulse to be supplied to the arcing means; and
   control means for controlling said laser pulse generator to generate a laser pulse of sufficient duration, to cause said plasma cloud to be sufficiently conductive to draw said stored energy from said storage means in said arcing means, to said worksite.

7. The apparatus of claim 6, wherein the inductor-capacitor discharge circuit is multi-mesh.

8. A laser-arc apparatus, comprising:
   a laser pulse generator for generating laser pulses having a predetermined repetition interval and duration, and for directing each of said laser pulses toward a worksite for creating a plasma cloud;
   arcing means operative when activated to initiate an arc from an electrode thereof to the worksite and operative when deactivated to extinguish the arc;
   circuit means having a pulse forming network including an inductor-capacitor discharge circuit, responsive to the plasma cloud associated with each generated pulse for activating said arc means; and
   limiting means for deactivating said arcing means prior to the generation of each directed laser pulse.

9. The apparatus of claim 8, wherein the inductor-capacitor discharge circuit is multi-mesh.

10. A laser-arc apparatus comprising:
    a laser pulse generator for generating a laser pulse and directing said pulse toward a worksite on a workpiece, said laser pulse creating a plasma cloud at said worksite by heating said worksite;
    an arcing means for arcing energy from an electrode thereof to said worksite;
    a power supply for supplying said energy to said arcing means;
    storage means for storing said energy including a critically damped discharge network for outputting a pulse waveshape corresponding to said stored energy; and
    control means including means for controlling said laser pulse generator to generate laser pulses, each being of sufficient duration to cause said plasma cloud to be sufficiently conductive to draw said stored energy from said storage means in said arcing means to said worksite for initiating an arc and each pulse interval being of sufficient duration for dissipating each created plasma cloud.

11. A laser-arc apparatus according to claim 10, further comprising a current limiting circuit for controlling the storage rate of said storage means.

12. A laser-arc apparatus according to claim 10, wherein said power supply is an AC power supply, and further comprising means for converting AC power from said AC power supply into DC power.

13. A laser-arc apparatus comprising:
    a laser pulse generator for generating a laser pulse and directing said pulse toward a worksite on a workpiece, said laser pulse creating a plasma cloud at said worksite by heating said worksite;
    an arcing means for arcing energy from an electrode thereof to said worksite;
    a power supply for supplying said energy to said arcing means;
    storage means for storing said energy including a pulse forming network for receiving said stored energy and including a critically damped discharge network for outputting said energy as a pulse waveshape forming an energy pulse to be supplied to said arcing means;
    a current limiting circuit including a hold-off inductor for controlling the storage rate of said storage means; and
    control means including means for controlling said laser pulse generator to generate laser pulses, each being of sufficient duration to cause said plasma cloud to be sufficiently conductive to daw said stored energy from said storage means in said arcing means to said worksite, the controlling means including means for synchronizing said switching network and said laser pulse generator for charging said pulse forming network between generated laser pulses.

14. A laser-arc apparatus comprising:
    a laser pulse generator for generating a laser pulse and directing said pulse toward a worksite on a workpiece, said laser pulse creating a plasma cloud at said worksite by heating said worksite;
    an arcing means for arcing energy from an electrode thereof to said worksite;
    a power supply for supplying said energy to said arcing means;
    storage means for storing said energy including a pulse forming network for receiving said stored energy and forming an energy pulse to be supplied to said arcing means;
    a current limiting circuit including a switching network for controlling the storage rate of said storage means; and
    control means including means for controlling said laser pulse generator to generate laser pulses, each being of sufficient duration to cause said plasma cloud to be sufficiently conductive to draw said stored energy from said storage means in said arcing means to said worksite, the controlling means including means for synchronizing said switching network and said laser pulse generator for charging said pulse forming network between generated laser pulses.

15. A laser-arc apparatus, comprising:
a laser pulse generator for generating laser pulses having a predetermined repetition interval and duration, and for directing each of said laser pulses toward a worksite for creating a plasma cloud;
arcing means operative when activated to initiate an arc from an electrode thereof to the worksite and operative when deactivated to extinguish the arc;
circuit means, including said arcing means, responsive to the plasma cloud associated with each generated pulse for activating said arcing means, said circuit means including a critically damped discharge network; and
limiting means for deactivating said arcing means for a time duration sufficient to effectively dissipate the plasma cloud prior to the generation of each directed laser pulse.

16. A laser-arc welding apparatus according to claim 15, wherein said circuit means comprises a pulse forming network.

17. A laser-arc welding apparatus according to claim 16, wherein said pulse forming network comprises a multi-mesh inductor-capacitor discharge circuit.

18. A laser-arc apparatus according to claim 15, wherein said limiting means comprises a hold-off inductor.

19. A laser-arc apparatus according to claim 15, wherein said limiting means comprises an electronic switching network.

20. A laser-arc apparatus according to claim 15, further comprising a processor means, connected to said laser pulse generator and said limiting means, for synchronizing the generation of said laser pulses with the deactivation of said arc means.

* * * * *